United States Patent [19]

Godbersen

[11] 4,249,711
[45] Feb. 10, 1981

[54] MINIATURE AIRPLANE MOTOR MOUNTING STRUCTURE

[76] Inventor: Byron L. Godbersen, Rural Route, Ida Grove, Iowa 51445

[21] Appl. No.: 51,721

[22] Filed: Jun. 25, 1979

[51] Int. Cl.³ .............................................. B64D 27/00
[52] U.S. Cl. ......................................... 244/54; 46/78; 248/554
[58] Field of Search ............................ 244/54, 55, 60; 74/242.13 R, 242.15 R; 46/78, 210; 248/554; 180/231, 59, 298

[56] References Cited

U.S. PATENT DOCUMENTS

| | | |
|---|---|---|
| 729,010 | 5/1903 | Synnestvedt .......................... 180/59 |
| 1,131,380 | 3/1915 | Huebner et al. ....................... 244/55 |
| 2,517,328 | 8/1950 | Lownsbery ................... 74/242.15 R |
| 3,744,180 | 7/1973 | Mabuchi ................................. 46/78 |

FOREIGN PATENT DOCUMENTS 770773  9/1934  France ....................................... 244/55

*Primary Examiner*—Galen L. Barefoot
*Attorney, Agent, or Firm*—Henderson & Sturm

[57] ABSTRACT

This invention relates to motor mounts in general, and more specifically to a universal motor mount to be employed in a model airplane, which will allow the motor to be disposed at any desired angle or altitude to accommodate engine or exhaust equipment beneath the engine cowling.

4 Claims, 6 Drawing Figures

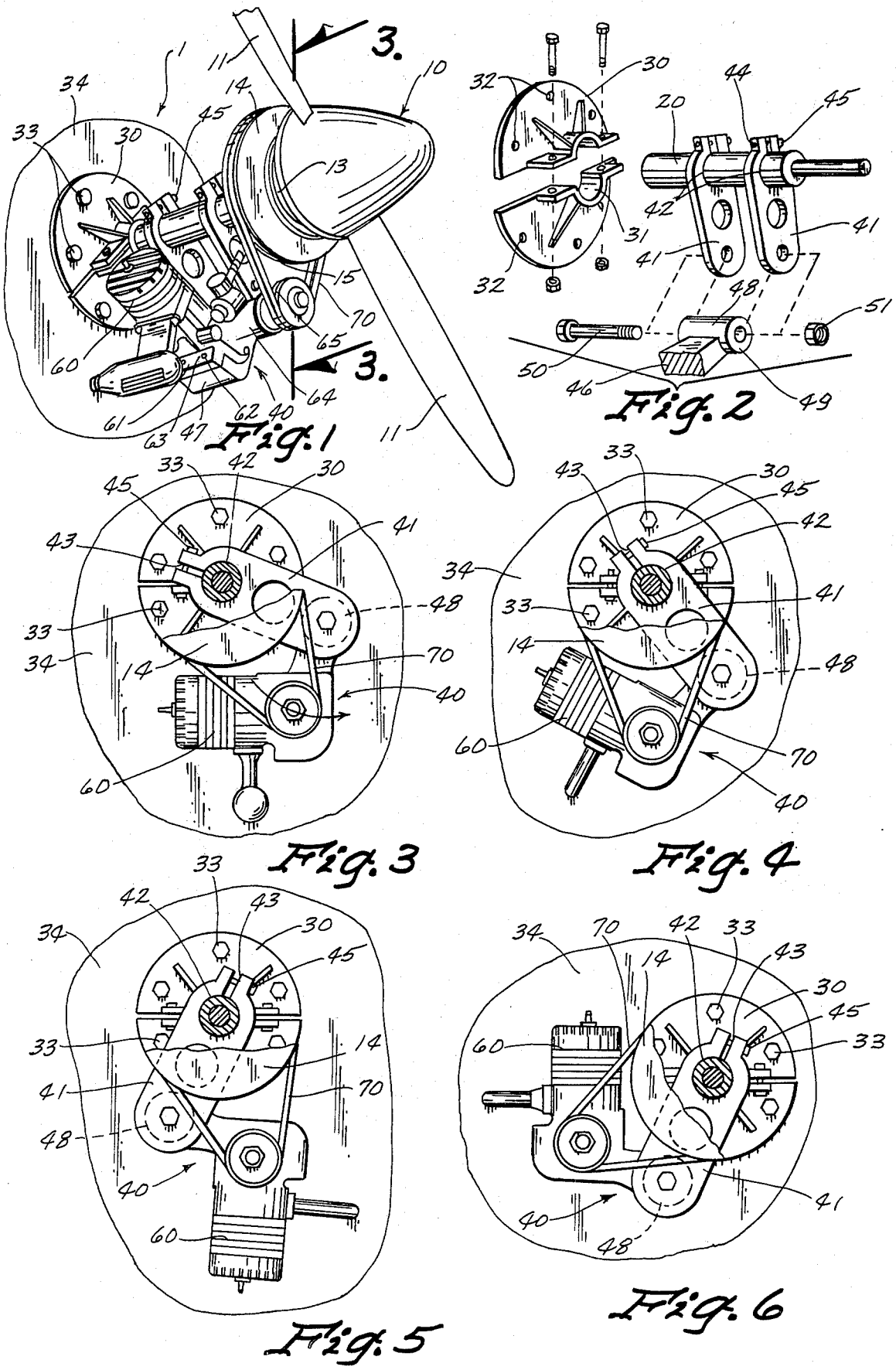

MINIATURE AIRPLANE MOTOR MOUNTING STRUCTURE

SUMMARY OF THE INVENTION

An object of the present invention is the provision of an adjustable motor mount for model airplanes and the like which can accommodate power plants for ¼-scale and larger models.

Another object of this invention is the provision of an engine mounting which is rotatably mounted on a central propeller shaft.

A further object of this invention is the provision of a rotatable engine mounting which is pivotable towards and away from the central propeller shaft upon which it is mounted.

Yet another object of the instant invention is the provision of an engine mounting which allows the forces generated by the propeller to be transmitted to the main structural component of the fuselage (i.e. the firewall).

A still further object of this invention is the provision of an adjustable motor mount which is articulated about two axes to position the motor or exhaust equipment beneath the engine cowling.

These and other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the adjustable motor mount and engine as it would appear secured to the firewall;

FIG. 2 is an exploded perspective view of the adjustable motor mount and the other components which comprise the assembly;

FIG. 3 is a cross-sectional view of the adjustable motor mount without the engine secured thereto as taken along the line 3—3 in FIG. 1, and with certain parts broken away; and FIGS. 4, 5 and 6 are views similar to FIG. 3, but showing the motor mounted at differing positions relative to the mount and with different exhaust equipment associated therewith.

BACKGROUND OF THE INVENTION

The instant invention relates to the mounting of motors to model airplanes and the like. In the past, several attempts have been made to produce adjustable mounting structures which would accommodate a variety of engine sizes and configurations. Examples of previously attempted solutions can be found in U.S. Pat. Nos. 3,985,322, 4,108,401 and 3,891,169.

While these prior art devices worked well for their intended purpose, they were limited in their versatility and usually restricted to movement in one direction only.

With the advent of ¼-scale and larger model airplanes, the entire area of technology has undergone a rethinking process, due to the increased power requirements necessary to rotate the propellers at sufficient rpm to get the heavier craft airborne.

The use of larger power plants has created its own unique set of problems which the prior art devices have failed to cope with.

DESCRIPTION OF THE PREFERRED EMBODIMENT

FIG. 1, which illustrates a preferred embodiment of the adjustable motor mount shows the entire assembly designated generally as 1 and the propeller assembly designated as 10. The propeller assembly comprises a pair of propeller blades 11 mounted on a hub element 12 having a forward conical portion and a rearward reduced diameter neck portion 13 which terminates in an enlarged diameter cylindrical flange 14 having one or more grooves 15 on its periphery.

The propeller assembly 10 is rotatably mounted on one end of an elongated shaft 20 in a manner well known in the art. A mounting disc 30 is frictionally secured to said elongated shaft on its other end by engagement of the shaft with the interior of a centrally disposed raised cylindrical sleeve 31 formed on the mounting disc 30. Disposed around the face of the mounting disc 30 are a plurality of apertures 32 through which securing means 33 attach the disc to a firewall member 34.

Supported on and suspended from the elongated shaft member 20 is the adjustable mounting or support bracket of the instant invention designated generally as 40. The mounting bracket 40 comprises a pair of support arms 41 and a pivoted engine support bracket 46. The support arms 41 have apertures 42 which are dimensioned to slideably receive the elongated shaft 20. The upper portions of the support arms are further provided with separations 43 which extend from the apertures 42 to the top of the support arms, and which extend completely through the width thereof. The purpose of this split arm construction is to allow a minimum flexure of the apertures around the circumference of the shaft and to facilitiate the engagement of the respective parts together. Each arm 41 is provided with a small threaded bore 44 which is transversely disposed on the upper portion of the support arm, and which when used in conjunction with a tightening screw 45 brings the split portions of the support arm together to frictionally secure the support arms to the shaft.

Pivotally attached to the lower portions of the support arms 41 is an engine support bracket 46, having an upturned lip 47 on one end, and an apertured cylindrical element 48 disposed on its other end. The aperture 49 in the cylindrical element 48 slidingly receives a pivot rod 50 which extends through apertures 52 in the support arms 41, and pivotally attaches the engine bracket to the support arms via securing means 51.

Mounted on the engine support bracket 46 is an engine generally designated as 60, having a flanged shoulder 61 with apertures 62 disposed therein. The engine 60 is attached to the engine support bracket 46 by securing the flanged shoulder 61 to the upturned lip 47 via suitable securing means 63. Obviously the engine may be attached to the support bracket at other locations and by other means, and this portion of the disclosure is for purposes of illustration only.

Extending from the engine 60 is a rotatable drive shaft 64 having one or more circumferential grooves 65 disposed in the drive shaft head. The engine 60 is operatively connected to the propeller assembly 10 via one or more drive belts 70 which are frictionally secured in the grooves 15 and 65 and which rotate the propellers in response to the output of the engine in a well known manner.

The adjustable motor mount of the preferred embodiment is intended to be lightweight and rigid and the support arms and engine are stamped from aluminum, and may further be provided with additional apertures which will reduce the overall weight without sacrificing structural integrity. The engine support bracket is dimensioned apertured to accommodate a variety of engine sizes and configurations and the drive belts employed are Polyflex V-belts which reduce slippage, wear and stretching, and are a marked improvement over toothed timing belts.

It should be appreciated by now that the adjustable feature of the mounting bracket allows the engine to be pivoted about the shaft axis and also about the lower pivot rod. This construction allows the engine to be mounted at any point about the 360° arc of rotation about the elongated shaft and it may also be pivoted about the lower pivot axis to position the engine proximate or remote from the shaft. This flexibility is extremely important given the space limitations in a model airplane engine cowling and allows the engine and exhaust equipment to be easily mounted in the most convenient and practical positions.

Having thereby disclosed the subject matter of this invention, it should be obvious that many modifications substitutions and variations of the invention are possible in light of the above teachings. It is therefore to be understood, that the invention may be practical other than as specifically described, and should be limited only by the scope and breadth of the appended claims.

I claim:

1. An adjustable model airplane engine mounting assembly for a model airplane, comprising:
   a propeller assembly rotatably mounted on one end of an elongated shaft;
   a mounting element secured to the other end of the elongated shaft, said mounting element frictionally engaging the elongated shaft to hold the elongated shaft rigidly to said model airplane; and
   a model airplane engine attached to a support bracket which is suspended from and rotatable about the elongated shaft.

2. An adjustable model airplane engine mounting assembly as in claim 1; wherein,
   the support bracket comprises an upper member pivotally connected to the shaft; and
   a lower member pivotally connected to said upper member.

3. An adjustable model airplane engine mounting assembly as in claim 2; wherein,
   the model airplane engine is secured to said lower member.

4. An adjustable model airplane engine mounting assembly as in claim 3; wherein,
   the support bracket is adapted to rotate the model airplane engine, both about the elongated shaft and towards and away from the elongated shaft.

* * * * *